Feb. 27, 1945. P. R. HEYGEL 2,370,165
INDICATING DEVICE
Filed July 8, 1942 2 Sheets-Sheet 1

INVENTOR
PAUL R. HEYGEL
BY
ATTORNEY

Feb. 27, 1945. P. R. HEYGEL 2,370,165
INDICATING DEVICE
Filed July 8, 1942 2 Sheets-Sheet 2

INVENTOR
PAUL R. HEYGEL
BY
Warley L. Parratt
ATTORNEY

Patented Feb. 27, 1945

2,370,165

UNITED STATES PATENT OFFICE 2,370,165

INDICATING DEVICE

Paul R. Heygel, Asheville, N. C., assignor to Ecusta Paper Corporation, a corporation of Delaware Application July 8, 1942, Serial No. 450,227

8 Claims. (Cl. 33—128)

My invention relates to machines for winding paper or any other material to form a roll, and more particularly to a device for continuously indicating the diameter of the roll while it is being wound so as to indicate the degree of compactness or looseness of the winding and thereby serve as a guide for adjustment of the paper tension or pressure on the winding mechanism.

The invention will be described hereafter with particular reference to a slitting and rewinding machine for producing narrow rolls of paper such as cigarette paper, but this is for illustrative purposes and not by way of limitation. For example, my invention may be applied to a machine that performs winding only without any slitting of the material into narrow rolls.

In the commercial production of wound rolls of paper in which each roll must contain the same length of paper, and must have the same final diameter or overall size when completed, it is very advantageous to have a means for automatically indicating the progressively increasing size of the wound roll. It enables the operator to control the operation of the machine, especially the tension and pressure regulating devices, so as to obtain the proper size roll. Also, it serves as a means for checking the thickness of the paper being wound under proper tension conditions.

The size of the roll is important from the standpoint of fitting into a standard size shipping box. The proper compactness of the roll is also important to prevent the core from slipping out and the roll from telescoping.

The device of my invention possesses the practical advantages of being inexpensive and very simple in construction and operation. It is normally used in conjunction with the usual mechanically operated counting devices, but functions independently thereof. It requires no fixed installation, and may be easily placed on the winding machine at the beginning or at any later stage of the winding operation, and will indicate immediately the diameter of the roll in terms of the length of paper that should be wound on a roll of that size. If this indicated length is substantially different from the length of the paper actually wound and recorded on the counting device, it shows that the winding has not been carried out under the proper tension or pressure, and compensating adjustments in the tension or pressure or both for additional winding should be made.

If it is found that the roll is being wound under proper tension and pressure and still is not of correct size for the measured length of paper wound on the roll, this indicates that the thickness of the paper is not correct. The device may therefore serve as a means for discovering incorrect thickness of the paper.

Details of construction and mode of operation of the device of my invention will be more clearly understood from the following description taken in conjunction with the accompanying drawings, in which.

Referring first to the indicating device itself, it comprises a tape or narrow flexible strip 10 of fabric, leather, paper, or any other suitable material which is dimensionally stable and receptive to print or otherwise marking of a scale thereon. In practice, I have found it of advantage to use a closely woven fabric of cotton or linen thread. To render the fabric resistant to moisture penetration and avoid dimensional changes possibly caused thereby, I prefer to treat the fabric with a water repellent material such as, for example, varnish or sizing.

One end of the tape is formed into a loop 11 which is closed along the line 12 by stitching or any other suitable means. Although not essential, I usually provide at the loop end of the tape, a pick-up tab 13 which facilitates handling of the measuring device when installing or removing it from the machine. This tab may be made of fibre board or any other suitable material which is easily handleable.

Figures 1, 2:
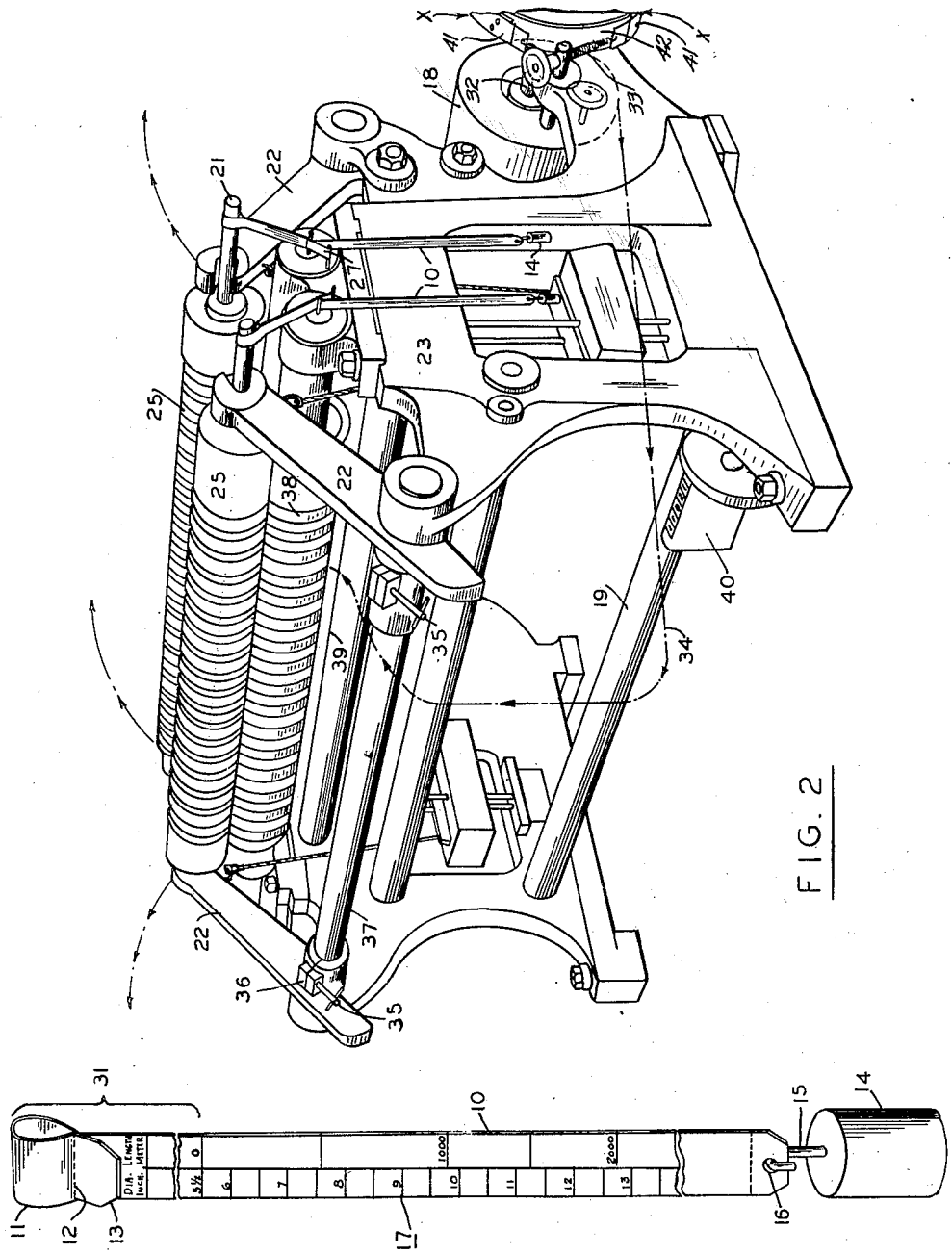
Fig. 1 is a side elevational view of my indicating device.
Fig. 2 is a side elevational view of a slitting and rewinding machine showing two of the indicating devices in operative positions.

At the end of the tape opposite the loop end, I provide means for maintaining the tape in smooth, extended position while it is being used, as described hereafter. Such means may be a conventional spring, or a weight as shown in Fig. 1. The weight 14 is connected to the tape 10 by means of a metal hook 15, the base of which is fastened to the weight and the hook portion threaded through an eye 16 in the tape.

Printed, stenciled or otherwise formed on the tape is a scale generally indicated at 17. This scale shows on the right side the length in meters of the paper or other material which should be wound on a roll having a diameter of a size indicated by the inches on the left side of the scale. In the specific example shown in Fig. 1, the scale is calibrated into five hundred meter divisions ranging from zero to six thousand meters (only part of which is shown in Fig. 1), and is also calibrated into the corresponding roll diameter sizes, in inches.

It is to be noted that the distances or spaces between the several divisions and sub-divisions on the meter side of the tape are not constant but vary from one end of the scale to the other. More specifically, the distance between numerals and marks progressively decreases from top to bottom of the scale. For example, the space or distance between the numerals 0 and 1000 on the scale is about 2 inches, whereas the distance between the numerals 1000 and 2000 on the scale is about an inch and a half. Such changes progress down the scale so that the space between the final numerals, i. e., 5000 and 6000, is only about three-fourths of an inch. The reason for this, as will appear from the subsequent description of the device in operation, is that the circumference of the roll being wound becomes progressively larger and the length of the wound material proportionally greater for each revolution.

Figure 3:
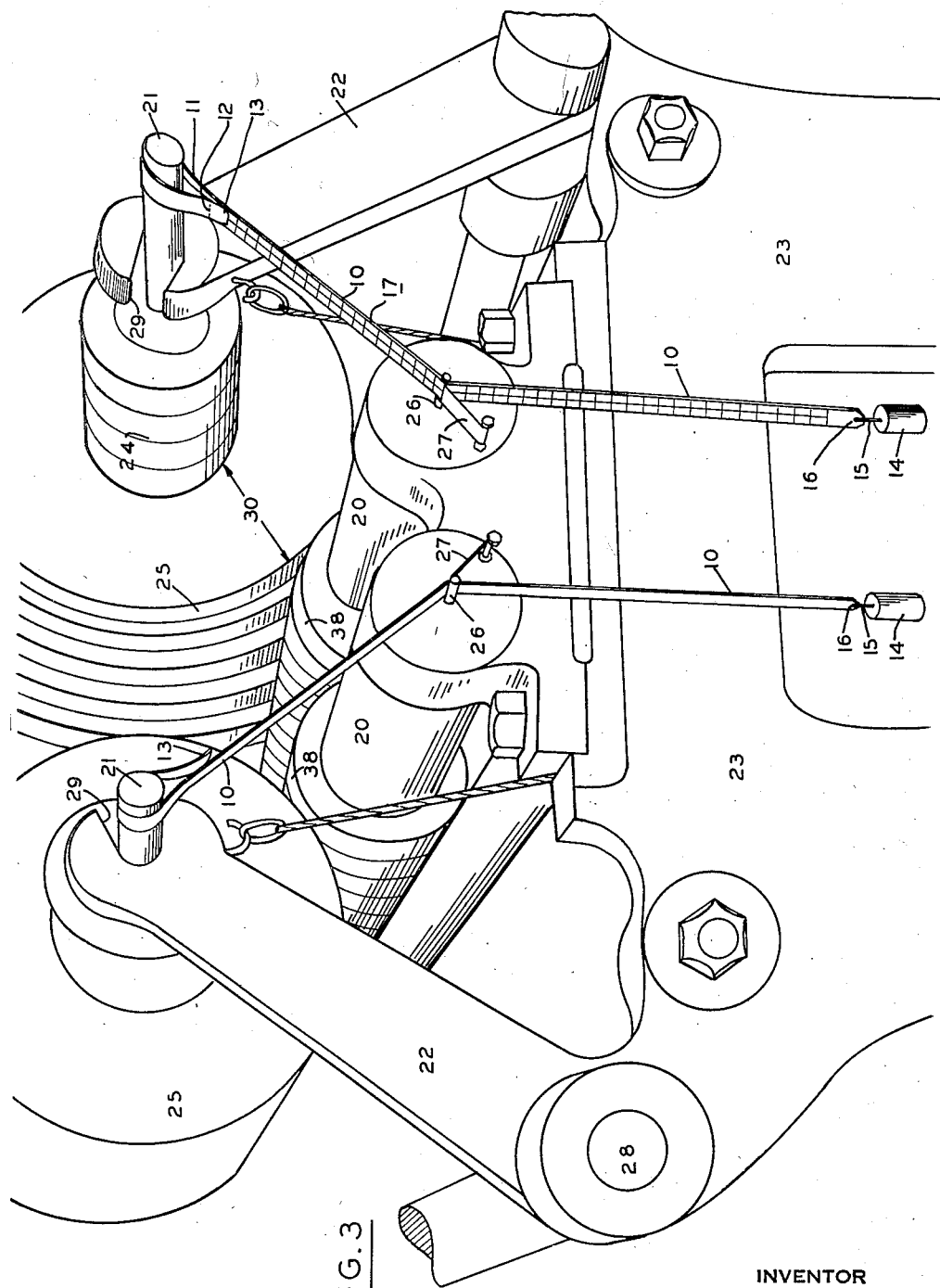
Fig. 3 is an end view of the machine shown in Fig. 2, and reels of paper slit and wound thereon.

The function of my device, when applied to a slitting and rewinding machine, will now be described. The details of construction of this machine which do not concern the present invention are not specifically described herein. The principal parts of the machine in so far as my indicating device is concerned comprise, a paper supply roll 18, a guide roll 19, knife shafts 20, and bobbin shafts 21. The shafts 21 are supported by arms 22 pivotally mounted on the machine frame 23, the shafts 21 support a sectioned reel 24 on which sections the several rolls, or bobbins as they are commonly called, of paper 25 are wound. As will be apparent from Fig. 3, the cigarette paper or other material supplied by the roll 18 and slit into separate narrow widths by the knives mounted on the shaft 20, is wound upon the separate reels 24 to form a plurality of separate rolls or bobbins 25.

The rolls 25, in one specific case, are wound to contain each six thousand meters of cigarette paper and should have a final diameter of approximately 21 inches so as to fit in uniform size shipping cartons. To insure winding under proper tension conditions to produce this size roll, the indicating device of my invention is employed in the manner illustrated in Fig. 3. As illustrated, when the loops 11 are placed over the bobbin shafts 21 and the weights 14 cause the tapes 10 to hang in a straight extended position. Now to utilize the tapes for measuring the length of paper wound on the two sets of rolls 25 each tape is placed over a supporting guide member 26. To facilitate reading of the numerals on the tape I provide a pointer or finger 27 which may be made of spring steel or any other suitable material adapted to maintain light contact with the tape 10. This contact should be such as to permit the tape 10 to move between the finger and the guide 26 as the size of the rolls 25 progressively increases during the slitting and winding operation. The edge of the finger 27 is advantageously a straight beveled edge which will serve as a vernier or pointer for indicating the divisions or parts of the divisions of the scale 17 which corresponds to the length of the paper which should be wound on the roll 25 for the size or diameter of the roll at any stage of the winding.

As the winding operation progresses the rolls 25 progressively increase in size and cause the arms 22 to be raised; that is, moved around their pivotal points 28. As the shafts 21 move upward and away from the guide member 26 they slowly and progressively draw the tapes 10 upward in sliding contact with the fingers 27. This progressive increase in length of the tapes between roll shafts 21 and finger 27 is indicated by the scale 17, and as stated, the increasing values of the numerals on the scale indicate a corresponding increase in diameter of the rolls 25 in terms of the length of the paper which should be wound on roll 25, at different stages, provided the winding has been carried out under the proper tension and pressure and the paper is of proper thickness.

To provide an accurate indication of the proper size of the roll by means of the device of my invention, it is necessary to make allowance for the length or distance between the center of roll shaft 21 and the outside surface of the reel 24 on which the paper is wound and likewise the distance between the guide 26 and the periphery of the knife roll 20. In other words, the distance from the outer surface of the reel 24 to the periphery of the roll 25 is to be measured; this distance being indicated in the drawings by the two arrows separated by the numeral 30. To measure this distance accurately the scale 17 on the tape 10 is first provided with a section which is identified in the drawings by the numeral 31. This section extends from the top of the loop 11 down to the zero line. Accordingly, the actual measurement of the paper begins with the zero line and extends downward to the last numeral, which in this case is six thousand. The diameter of 5½ inches, shown opposite the zero meter line, represents the diameter of the core of the roll 25.

The function of my device with regard to the regulation of the tension and pressure mechanisms to provide the proper size roll will now be described more in detail. The tension on the paper supplied from the roll 18 is governed by brake bands 41 that encircle the brake drums 42 mounted on each end of the supply roll shaft 32. By regulating the hand screw 33 the braking action on the roll 18 is varied so as to provide the proper tension to the paper sheet 34.

The pressure on the slit paper rolls 25 is controlled by adjustment of the hand screws 35 that tighten or loosen the slit bearings 36, of the arms 22, on the shaft 37. The resistance to rotation of these arms on the shaft 37 is increased or decreased as desired by tightening and loosening, respectively, the bearings 36 on the shaft 37.

The paper supplied from the roll 18, passes under and around the guide roll 19 then around guide rolls 35 and 39, and is finally drawn up between the knives 38 on the knife shafts 20, which are power driven. It is slit into narrow widths by the rotating knives 38 and finally wound onto the reels 24. As the paper passes over the roll 19 the length of the paper is measured by the mechanically operated counting device 40. This device shows the exact length of the paper which is being wound on the rolls 25.

Now, if the proper tension and pressure is being applied to the paper and the paper is of proper thickness, the figure on the counter 40 should correspond with the figure on the tape 10 which at that time is opposite the pointer 27. If there is a substantial discrepancy between the counter figure and the figure on the indicator tape 10, it means that the roll 25 is not being wound to the proper size. The machine operator is thereby warned and he then adjusts the tension or pressure on the paper, or both if necessary, by manipulating the hand screws 33 and 35 as described above. Such adjustments are made in accordance with the experience of the operator to give proper winding and the desired size roll.

If these adjustments still do not correct the inaccuracies in roll size, it indicates that the paper being wound is not of standard thickness. The operator therefore stops the machine and has the thickness of the paper accurately determined by instrument measurement. Continuous measurement of the thickness of the paper by sensitive instruments during winding is not practical and the use of my device as described above for checking up on this characteristic of the paper while it is being wound is a very important feature.

While the machine is being prepared for starting the operation described above, the indicating device may be held between members 26 and 27, the tab 13 engaging member 27, or it may be located at any other convenient place until the roll shafts for the next rolls to be wound are positioned in the bearings 29 of the arms 22.

It will be understood that one or any desired greater number of my devices may be used on a machine at one time. The arrangement shown in Fig. 2 utilizes two of the devices, each of which operates in the manner described above, but independently of each other so that they may be used singly or in any desired greater number. Instead of on a slitting machine, the measuring device may be employed on a machine which rewinds without any slitting or generally on any type of machine in which it is desired to determine easily and efficiently the diameter of the roll or the length of the material wound thereon.

Various modifications and changes may be made in the materials and operation described hereinabove without departing from the scope of my invention, some of the novel features of which are defined in the following claims.

I claim:

1. In a machine for slitting a relatively wide roll of paper and rewinding the same into a plurality of narrow rolls of like paper content and diameter on a common shaft which is mounted to move arcuately into a different axial plane during winding of the roll, the combination of an indicating device comprising an elongated flexible member slidably supported in suspension from said shaft whereby to be moved lengthwise by movement of the shaft and being maintained in substantially straightened position, said flexible member having a scale longitudinally thereon with various sub-divisions that indicate the varying lengths of the paper wound on said narrow rolls, a guide device for said elongated flexible member, and a pointer element in contact with said flexible member so as to cooperate with the scale to indicate an accurate measurement of the length of paper wound on the respective narrow rolls.

2. An indicating device adapted for indicating at any time during the winding operation the length of paper wound on a roll, comprising a calibrated tape with progressive variable proportioned units indicative of length measurement, a loop at one end of said tape for attachment to a supporting shaft for said roll, said shaft being adapted for rotation of the roll thereon and mounted to move into a different axial plane during winding of the roll and causing lengthwise movement of the loop-attached tape, and a weight at the unattached end of said tape for maintaining the tape in straightened aligned position.

3. A device for indicating progressively during a winding operation the length of material of a certain thickness wound on a roll supported by a shaft, comprising an elongated fabric member having a calibrated scale thereon, means for connecting said fabric member to said shaft, means for maintaining said member in straightened position and appropriately located means for locating the division on said scale which corresponds at any time during the operation with the length of material that has been wound on the roll.

4. A device for indicating the actual size of a roll of material as wound in comparison to the predetermined proper size the roll should be for a given thickness of material and an indicated accurate measurement of the length of the material carried to and taken up in the roll, said roll having an axial shaft in a supported working position that changes laterally as the roll increases in diameter during the winding operation, said indicating device comprising an elongated member adapted to be attached at one end to said shaft of the roll of material and thus be extended from the shaft, said elongated member having a longitudinal scale thereon which is calibrated for progressive comparative indication of the diameter of the roll in the stages of the winding process, and cooperatively associated means in supported relation to which said elongated member is moved lengthwise during the roll winding operation, said means including a pointer element in correlation to the scale of said elongated member for determining the roll size indication on the scale.

5. In a machine for winding continuous web material into roll form, such machine comprising a shaft on which the roll is wound and whose supported working position changes laterally as the roll increases in diameter during the winding of the material therein, the machine further including a device for accurately indicating the length of the material carried to and taken up in the roll, the combination therewith of a comparative indicator device for indicating the actual size of said roll as it is being formed in comparison to the size the roll should be for a given thickness of web material and the pre-indicated length of the material carried to and taken up in the roll, said comparative indicator device comprising an elongated member having a means at one end for attaching it to the roll shaft, a longitudinal scale on said elongated member calibrated to correspond to various lengths of the material so as to indicate progressively the proper size the roll of material should be for the length of the material in the roll, and cooperatively associated means in supported relation to which said elongated member is moved lengthwise during the roll winding operation, said means including a pointer element in correlation to the scale on said elongated member for determining the roll size indication on the scale.

6. In a machine for slitting a relatively wide roll of paper and rewinding the same into a plurality of narrow rolls of like paper content and diameter and supported on a common shaft whose supported working position changes laterally as the several rolls are wound simultaneously thereon; the combination of an indicating device comprising an elongated flexible member attached at one end to said shaft and maintained taut in suspension from the shaft, said flexible member having a longitudinal scale thereon with various calibrated sub-divisions indicative of the length of the paper of an approximate given thickness and wound under proper tension and compactness of convolutions in the respective narrow rolls, means for supporting and guiding said elongated flexible member in its lengthwise movement as the said rolls increase in diameter and the roll shaft working position accordingly changes, and a pointer element in correlation to said supporting and guiding means to determine the reading of the scale on said flexible member.

7. A device adapted for indicating at any time during the winding operation the actual diameter of a wound paper roll in comparison to the predetermined proper diameter of the roll for a given thickness and length of paper wound, comprising a rotative roll and a supporting spindle therefor, said spindle being mounted for lateral movement to permit arcuate displacement of said wound roll and simultaneous lengthwise movement of said indicating device, a calibrated tape, a loop at one end of said tape for attachment to said spindle, means at the other end of said tape for tautening and maintaining the tape in straightened aligned position, and a correlated indicator element with relation to which said tape moves lengthwise as the axial position of said spindle changes laterally during the winding and diameter increase of the roll.

8. A device of the character described, adapted to indicate, during winding operation, the actual size of a wound roll of web material, comprising an elongated member having a calibrated longitudinal scale thereon, said scale including indicia indicative of diameter and correlated other indicia indicative of the length of material wound in the roll, a support for said roll positioned to receive one end of said elongated member and mounted to move arcuately into a different plane and effect simultaneous lengthwise movement of said member during winding of the roll, whereby, upon enlargement of roll diameter during winding operation, said member is correspondingly moved lengthwise progressively and in proportion to expansion of the roll, and means in cooperative relation to which said elongated member is moved to indicate the diameter of said roll and the length of material wound therein.

PAUL R. HEYGEL.